(12) United States Patent
Sharma et al.

(10) Patent No.: US 10,585,468 B2
(45) Date of Patent: Mar. 10, 2020

(54) DATACENTER POWER MANAGEMENT USING DYNAMIC REDUNDANCY

(71) Applicant: Virtual Power Systems, Inc., Milpitas, CA (US)

(72) Inventors: Nikhil Sharma, El Dorado Hills, CA (US); Akshay Krishnamoorthy, Santa Clara, CA (US); Karimulla Raja Shaikh, Cupertino, CA (US); Shankar Ramamurthy, Saratoga, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 194 days.

(21) Appl. No.: 15/666,499

(22) Filed: Aug. 1, 2017

(65) Prior Publication Data

US 2018/0052503 A1 Feb. 22, 2018

Related U.S. Application Data

(60) Provisional application No. 62/376,881, filed on Aug. 18, 2016.

(51) Int. Cl.
*G06F 11/00* (2006.01)
*G06F 1/30* (2006.01)
(Continued)

(52) U.S. Cl.
CPC ............ *G06F 1/30* (2013.01); *G05B 13/042* (2013.01); *G05B 13/048* (2013.01); *G06F 1/263* (2013.01);
(Continued)

(58) Field of Classification Search
CPC . G06F 1/30; G06F 1/263; G06F 1/266; G06F 1/28; G06F 1/32; G06F 1/3206;
(Continued)

(56) References Cited

U.S. PATENT DOCUMENTS

| 6,396,170 B1 | 5/2002 | Laufenberg et al. |
| 6,967,283 B2 | 11/2005 | Rasmussen et al. |

(Continued)

FOREIGN PATENT DOCUMENTS

| EP | 2372861 B1 | 10/2011 |
| JP | 2009232521 A | 10/2009 |

(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.

(Continued)

*Primary Examiner* — Anthony J Amoroso
(74) *Attorney, Agent, or Firm* — Adams Intellex, PLC (57) ABSTRACT

Techniques for datacenter power management using dynamic redundancy are disclosed. A power control switch is configured to selectively apply power to one or two power cords of a dual-corded electronic apparatus. When the power control switch energizes both power cords, the electronic apparatus operates in 2N redundancy. When the power control switch energizes only one of the power cords, the electronic apparatus operates in 1N redundancy. The power control switch is configured to dynamically change the redundancy mode based on service level agreement (SLA) criteria, power policies, power supply and demand, and environmental factors.

26 Claims, 7 Drawing Sheets

(51) Int. Cl.
| | |
|---|---|
| *G06F 9/48* | (2006.01) |
| *G06F 1/28* | (2006.01) |
| *G06F 1/3206* | (2019.01) |
| *H02J 3/46* | (2006.01) |
| *G06F 1/26* | (2006.01) |
| *G06F 1/32* | (2019.01) |
| *H02J 3/38* | (2006.01) |
| *G05B 13/04* | (2006.01) |
| *G06F 9/50* | (2006.01) |
| *G06F 1/3209* | (2019.01) |
| *H02J 3/00* | (2006.01) |
| *H02J 3/14* | (2006.01) |

(52) U.S. Cl.
CPC .............. *G06F 1/266* (2013.01); *G06F 1/28* (2013.01); *G06F 1/32* (2013.01); *G06F 1/3206* (2013.01); *G06F 1/3209* (2013.01); *G06F 9/4893* (2013.01); *G06F 9/5094* (2013.01); *H02J 3/382* (2013.01); *H02J 3/46* (2013.01); *H02J 3/006* (2013.01); *H02J 3/14* (2013.01); *H02J 2003/003* (2013.01); *Y02D 10/22* (2018.01)

(58) Field of Classification Search
CPC ........ G06F 1/3209; G06F 1/26; G06F 1/3203; G06F 9/4893; G06F 9/5094; G06F 9/5083; G05B 13/042; G05B 13/048; H02J 3/382; H02J 3/46; H02J 3/006; H02J 3/14; H02J 3/12; H02J 3/381; H02J 2003/003; Y02D 10/22; Y02D 10/20; Y02D 10/28; Y02D 10/30; Y02D 10/34
See application file for complete search history.

(56) References Cited

U.S. PATENT DOCUMENTS

| | | | |
|---|---|---|---|
| 7,236,896 B2 | 6/2007 | Farkas et al. | |
| 8,193,662 B1 | 6/2012 | Carlson et al. | |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,958,923 B2 | 2/2015 | Kake et al. | |
| 9,641,025 B2 | 5/2017 | Agrawal et al. | |
| 9,865,998 B1 * | 1/2018 | Emert | H02J 9/04 |
| 9,871,408 B2 | 1/2018 | Narita | |
| 2003/0056125 A1 | 3/2003 | O'Conner et al. | |
| 2005/0071092 A1 | 3/2005 | Farkas et al. | |
| 2005/0162019 A1 | 7/2005 | Masciarelli et al. | |
| 2006/0082222 A1 | 4/2006 | Pincu et al. | |
| 2007/0216229 A1 | 9/2007 | Johnson, Jr. et al. | |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0037225 A1 | 2/2010 | Doyle et al. | |
| 2010/0058092 A1 | 3/2010 | Bougaev et al. | |
| 2010/0077238 A1 | 3/2010 | Vogman et al. | |
| 2010/0205469 A1 | 8/2010 | McCarthy et al. | |
| 2010/0211810 A1 | 8/2010 | Nacho | |
| 2010/0264741 A1 | 10/2010 | Togare | |
| 2010/0328849 A1 | 12/2010 | Ewing et al. | |
| 2011/0133559 A1 | 6/2011 | Yamashita et al. | |
| 2011/0245988 A1 * | 10/2011 | Ingels | G06F 1/26 700/295 |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2015/0057821 A1 | 2/2015 | Nasle | |
| 2015/0378408 A1 | 12/2015 | Kaplan | |
| 2015/0380968 A1 | 12/2015 | Lee | |
| 2016/0209901 A1 | 7/2016 | Wilcox et al. | |
| 2016/0320825 A1 | 11/2016 | Panda et al. | |
| 2017/0025876 A1 | 1/2017 | Chan | |
| 2017/0170683 A1 * | 6/2017 | Navarro | G06F 1/263 |
| 2017/0177047 A1 | 6/2017 | Fluman et al. | |
| 2019/0122132 A1 | 4/2019 | Rimini et al. | |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

* cited by examiner

DATACENTER POWER MANAGEMENT USING DYNAMIC REDUNDANCY

RELATED APPLICATIONS

This application claims the benefit of U.S. provisional patent application "Automated Intelligent Scheduling of Energy Storage in Data Centers" Ser. No. 62/376,881, filed Aug. 18, 2016. The foregoing application is hereby incorporated by reference in its entirety.

FIELD OF ART

This application relates generally to power control and more particularly to datacenter power management using dynamic redundancy.

BACKGROUND

Datacenters that house large amounts of computing equipment are critical for modern business and commerce systems. Applications such as banking, e-commerce, cloud computing, cloud storage, video sharing, and social media all rely on datacenters to implement their respective services. The reliability of such datacenters is a function of the reliability of the electric power sources used by these datacenters.

According to recent indications, over 70 percent of datacenters suffer an unplanned outage of some duration within a 24-month period. The most common cause of a power outage is inclement weather. However, power outages can also occur from simple equipment failure or an accidental severing of a buried power line. No matter what the reason is, an unplanned outage can cost a company a significant amount of money, especially if the affected organization's revenues are dependent upon Internet sales/access. It has been estimated that the average U.S. datacenter loses approximately $138,000 for one hour of datacenter downtime per year. Thus, it is desirable to avoid downtime as much as possible. Due to the high costs of a datacenter outage, a Service Level Agreement (SLA) is often used between a datacenter and its clients to establish a level of various service attributes. Service attributes can include responsiveness, monitoring, and reliability, among others. For the attribute of reliability, power supplied to the datacenter plays a key role in the uptime of a datacenter.

With datacenters, also known as "server farms," there can be hundreds or even thousands of racks, each housing interconnected devices. The devices on the racks typically provide functionality, including the storage, processing, and retrieval of data. Given the power requirements demanded by the rack-mounted devices, reliable and efficient power delivery is crucial for the organizations using the datacenters to successfully operate. In some cases, the reliability and availability requirements placed on the devices powering the datacenter infrastructure must meet or exceed predetermined statutory requirements, as is the case for financial institutions.

Regardless of the type of institution, various infrastructure requirements must be met in order to address the important issues of availability, reliability, job load, and other organizational requirements of datacenters. For example, the issue of effectively cooling a datacenter (i.e. the removal of excess heat) is a critical issue which must be addressed to ensure stable and reliable operation of the datacenter. The cooling of modern datacenters is so important that it can directly impact the layout and architectural design of the center. Another significant datacenter design consideration involves providing sufficient power to the datacenter. Particularly in the case of high-reliability datacenters such as those used for e-commerce, banking, airline reservations, video distribution, and the like, power can be provided by more than one power grid, while for other datacenters, power can be provided by a combination of a power grid and locally generated power. For all applications, prevention of datacenter downtime, and proper redundancy for a given Service Level Agreement are important aspects of successful datacenter operation.

SUMMARY

Service Level Agreements (SLA) are an important aspect of datacenter operations. The SLA can specify a guaranteed uptime percentage and/or a particular redundancy configuration under certain conditions. It is therefore desirable to have the ability to dynamically configure a power redundancy mode for one or more servers (or other pieces of equipment) to enable an improved level of control and granularity in implementing SLAs, power policies, and other important functions in datacenter operations.

Embodiments include a processor-implemented method for power control comprising: coupling a first power source and a second power source within a datacenter to a first set of power loads through a power control switch, wherein: the first set of power loads is capable of receiving 2N redundancy; the first power source and the second power source combined provide 2N redundancy to the first set of power loads; the power control switch includes software programming; and the power control switch changes the redundancy to the first set of power loads from 2N redundancy to 1N redundancy based on the software programming.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Datacenters can contain hundreds, or even thousands, of computers and other associated equipment, such as disk arrays, data backup, routers, and other networking and storage equipment. Managing power distribution for efficiency and reliability can be challenging. This disclosure provides techniques for datacenter power management using dynamic redundancy. In many datacenter business arrangements, a service level agreement (SLA) indicates a level of service to be provided by a datacenter to a given customer. The SLA can specify performance criteria such as percentage of uptime, response time, and the like. In order to maintain a high percentage of uptime, some servers within a datacenter may be dual-corded and configured for 2N redundancy. In such an arrangement, the server has two power inputs, and each input may be supplied by a separate power source (e.g. Grid and a Diesel Generator). The 2N redundancy means that if one of the power sources is disrupted (e.g. the Grid), the other power source has the capacity to meet the power requirements of the datacenter. Other servers within a datacenter may be single-corded, and thus, only capable of being configured for 1N redundancy (a single power source providing the power). Thus, there can be a mix of 2N configured servers and 1N configured servers in a datacenter.

The power requirements of a datacenter can be dynamic. The datacenters can have dynamic power requirements that result in uneven power consumption during operation. The dynamic power requirements can be attributable to factors such as job mix, user mix, time of day, day of month, time of year, etc. For example, a datacenter that is primarily used for overnight backup of data might have increased power consumption overnight, with lower power consumption during the day. As another example, a datacenter that is primarily used during business hours can have increased power consumption attributable to heating, ventilation, cooling, and air conditioning (HVAC), lighting, communications, and so on. Additionally, computerized load balancing can create conditions for dynamic power requirements that are unpredictable and require a fast response in order to accommodate them. For example, subscriber-based systems might have increased power requirements when many customers/users simultaneously log in to use a system or application. Exactly when the increased power requirements can happen may not be known a priori.

In order to meet changes in demand, disclosed techniques provide a mechanism for dynamically switching from 2N redundancy to 1N redundancy for one or more servers within a datacenter. In embodiments, the datacenter may have a plurality of servers configured for permanent 2N redundancy, a plurality of servers configured for permanent 1N redundancy, and a plurality of servers configured for dynamic-N redundancy. The dynamic-N redundancy servers can be dynamically switched between 1N redundancy and 2N redundancy based on various criteria. The criteria can include, but is not limited to, SLA stipulations, power loading requirements, power supply availability, and/or time of day. The dynamic-N redundancy servers are coupled to a power control switch that provides 1N or 2N redundancy based on the criteria. The power control switch comprises a microcontroller that enables software programmable dynamic redundancy modification. This allows increased flexibility in a datacenter for meeting dynamic power requirements while still honoring Service Level Agreements for the datacenter.

Techniques for datacenter power management using dynamic redundancy are disclosed. A power control switch is configured to selectively apply power to one or two power cords of a dual-corded electronic apparatus. When the power control switch energizes both power cords, the electronic apparatus operates in 2N redundancy. When the power control switch energizes only one of the power cords, the electronic apparatus operates in 1N redundancy. The power control switch is configured to dynamically change the redundancy mode based on service level agreement (SLA) criteria, power policies, power supply and demand, and environmental factors.

Figure 1:
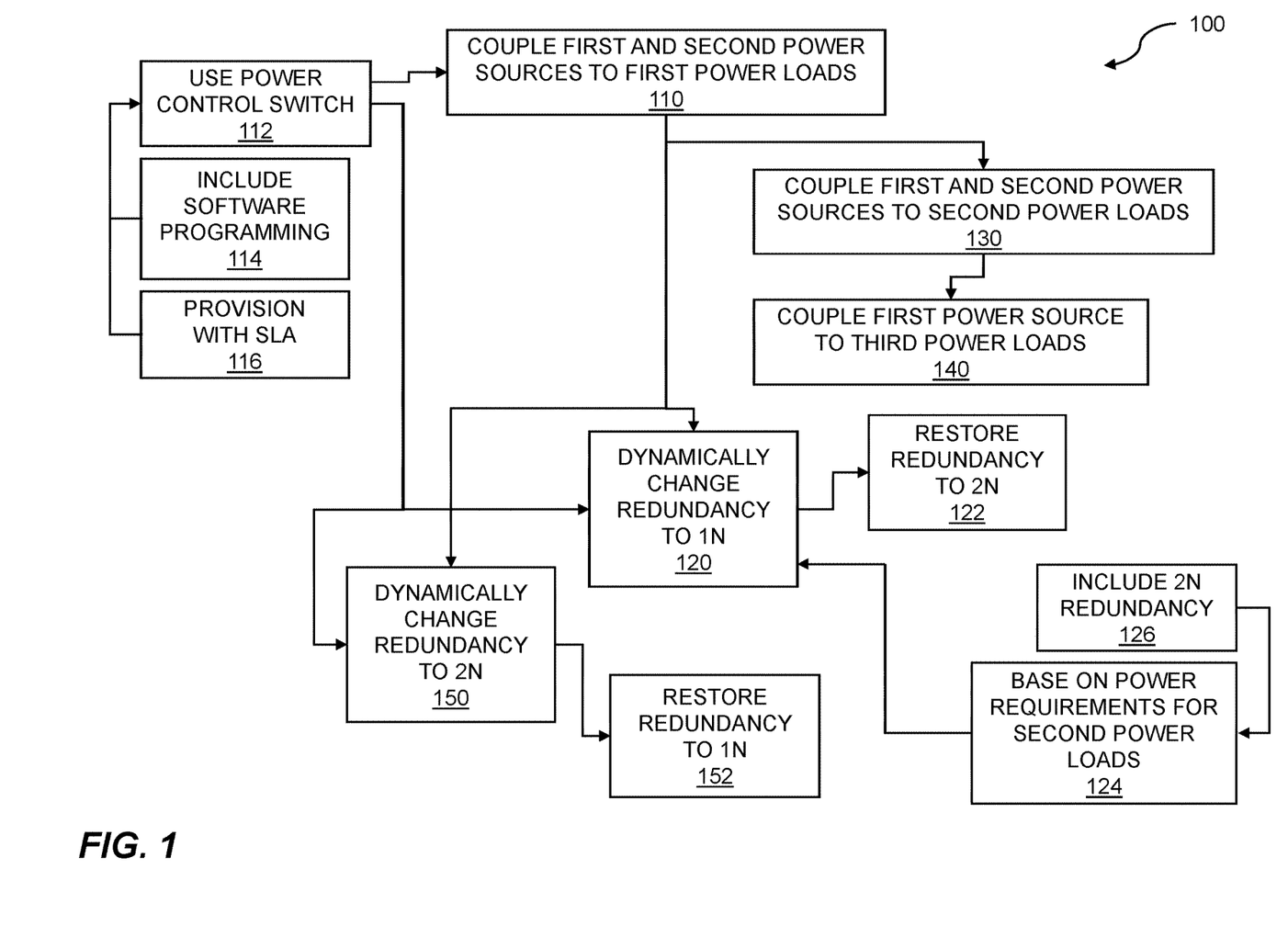
FIG. 1 is a flow diagram for datacenter power management using dynamic redundancy.

FIG. 1 shows a flow diagram for datacenter power management using dynamic redundancy. The flow 100 illustrates a processor-implemented method for power control. The flow 100 includes coupling a first power source and a second power source within a datacenter to a first set of power loads 110 through a power control switch 112. In embodiments, the first set of power loads comprises a first set of servers.

In embodiments, the first power source and the second power source are both power grid sources. In some embodiments, the second power source may include one or more alternate sources in the form of a locally generated power source. In embodiments, a datacenter can include a variety of power sources. Additionally, the first power source and/or second power source can include a power cache. The power cache can include, but is not limited to, a battery, a capacitor, and/or an electromechanical source. An electromechanical source can include flywheel-based energy storage, where the flywheel is spun by a power source during an energy surplus condition, and the flywheel drives a generator to provide power during periods of increased energy demand. An electromechanical source can also include pumps that pump water to a higher potential during a period of energy surplus and then release the water during a period of increased energy demand in order to generate electricity. Another example of an electromechanical source can include compressors that compress air in a tank to a higher pressure during a period of energy surplus and then release the compressed air to power a generator during a period of increased energy demand in order to generate electricity. Other electromechanical power caches are possible. The power cache can be replenished by one or more sources. In some cases, the power cache can be replenished from the grid via power utilities. In other cases, the power cache can be replenished from an alternate source such as a diesel generator set, solar power, wind power, water power, and/or tidal power generation.

The power loads can include a variety of devices, such as computers, disk arrays, network routers, and other datacenter equipment. The power loads can be configured into racks within the datacenter. In embodiments, multiple racks may be organized into a hierarchy of groups, clusters, and/or other logical groupings. The power control switch 112 is configured to dynamically switch one or more loads from 2N redundancy to 1N redundancy and/or from 1N redundancy to 2N redundancy. Thus, embodiments include dynamically changing from 1N redundancy to 2N redundancy using the power control switch. Additionally, embodiments can include dynamically restoring 1N redundancy using the power control switch.

In embodiments, the first set of loads is capable of receiving 2N redundancy. The first set of loads may include dual-corded servers, dual-corded switches, dual-corded storage arrays, and/or other dual-corded equipment. The dual-corded equipment includes two power cords and is configured to operate if any one of the two power cords of the dual-corded equipment is receiving appropriate power from a power source. Thus, in embodiments, the first set of servers is dual-corded. In embodiments, the first power source and the second power source combined together provide 2N redundancy to the first set of loads.

The flow 100 further includes software programming 114 for power control switch 112. The software programming can include programming to set the power control switch 112 for 1N redundancy or 2N redundancy based on various criteria. The flow 100 can include provisioning with a Service Level Agreement (SLA). The criteria can include data provided by the SLA. For example, the SLA can specify certain times where 2N redundancy is required, and other times where 2N redundancy is not required. As an example, a video hosting operation may require 2N redundancy during periods of peak programming during evening hours, and allow 1N redundancy during overnight hours when viewership is reduced. Other criteria can include current and/or anticipated demand from power loads, and environmental conditions such as weather, temperature, and the like. Thus, in embodiments, the power control switch includes software programming.

The flow can include provisioning with a service level agreement 116. In embodiments, a service level agreement (SLA) power provisioning is provided to the first set of power loads by the first power source, the second power source, and the power control switch. The provisioning can include configuring the power control switch such that the desired servers and/or other equipment is configured with 2N redundancy and/or 1N redundancy as specified by the service level agreement, power policies, environmental conditions and/or other factors.

The flow 100 includes coupling the first power source and the second power source within the datacenter to a second set of power loads 130. In embodiments, the second set of power loads comprises a second set of servers. In embodiments, the second set of power loads are configured such that they bypass the power control switch. In embodiments, the second set of servers is dual-corded.

The flow 100 further includes coupling the first power source to a third set of power loads 140. In embodiments, the third set of power loads is capable of receiving 1N redundancy power. In embodiments, the third set of power loads includes single-corded servers, switches, and/or storage arrays. Embodiments can include coupling the first power source within the datacenter to a third set of power loads without going through the power control switch. Thus embodiments can include coupling the first power source within the datacenter to a third set of power loads, where the third set of power loads bypasses the power control switch. In embodiments, the third set of power loads is provided 1N redundancy by the first power source within the datacenter. In some embodiments, the third set of power loads comprises a third set of servers. In embodiments, the third set of servers is single-corded.

The flow 100 includes dynamically changing redundancy to 1N 120. Thus, embodiments can include dynamically changing from 2N redundancy to 1N redundancy using the power control switch. The flow further includes 2N redundancy 126. In embodiments, the power control switch changes the redundancy to the first set of loads from 2N redundancy to 1N redundancy based on the software programming. Various criteria may be used in determining when to change the redundancy mode of one or more power loads from 2N redundancy to 1N redundancy. The flow can include basing the changeover on power requirements for the second power loads 124. Factors include actual power demand, and/or projected power demand. For example, if actual power demand and/or projected power demand increase, then one or more power loads may be switched from 2N redundancy to 1N redundancy to make more power available to meet the increased power demand. In embodiments, the power requirements for a second set of power loads include 2N redundancy. Embodiments can further include dynamically restoring 2N redundancy using the power control switch.

The flow 100 further includes restoring the power redundancy mode to 2N 122. The restoration criteria can include actual and/or projected power demand falling below a predetermined threshold. As an example, an ecommerce website may have peak usage between 8:00 AM and 6:00 PM. After 6:00 pm, with peak usage over, the power demand is reduced, and the availability of power enables configuration of the power loads with 2N redundancy again. In embodiments, a criterion for changing the redundancy mode includes performing an SLA verification. The SLA verification includes checking SLA conditions to confirm that changing the redundancy mode does not cause an SLA violation. Embodiments include dynamically changing from 2N redundancy to 1N redundancy 120 using the power control switch. In embodiments, the dynamically changing is based on power requirements for a second set of power loads. In some embodiments, one or more power loads are configured to be normally in a 2N redundancy mode, with dynamic changes to 1N redundancy mode based on various criteria.

In some embodiments, one or more power loads are configured to be normally in a 1N redundancy mode, with dynamic changes to 2N redundancy mode based on various criteria. The criteria can include, but is not limited to, SLA conditions, projected power demand, actual power demand, and/or environmental conditions such as weather forecasts. As an example, when severe weather is predicted for an area that could affect a datacenter, one or more power loads that are normally configured as 1N redundancy may be configured for 2N redundancy. Since the risk of a power disruption generally increases during severe weather, configuring the power loads for 2N redundancy can help to mitigate that risk, and maintain a higher level of reliability for the datacenter. Once the severe weather has passed, the power loads may then be restored to 1N redundancy. Thus, the flow 100 can include dynamically changing the redundancy mode to 2N 150. The flow 100 further includes dynamically restoring 1N redundancy 152. In embodiments, the changeover between 1N redundancy and 2N redundancy is performed using the power control switch. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
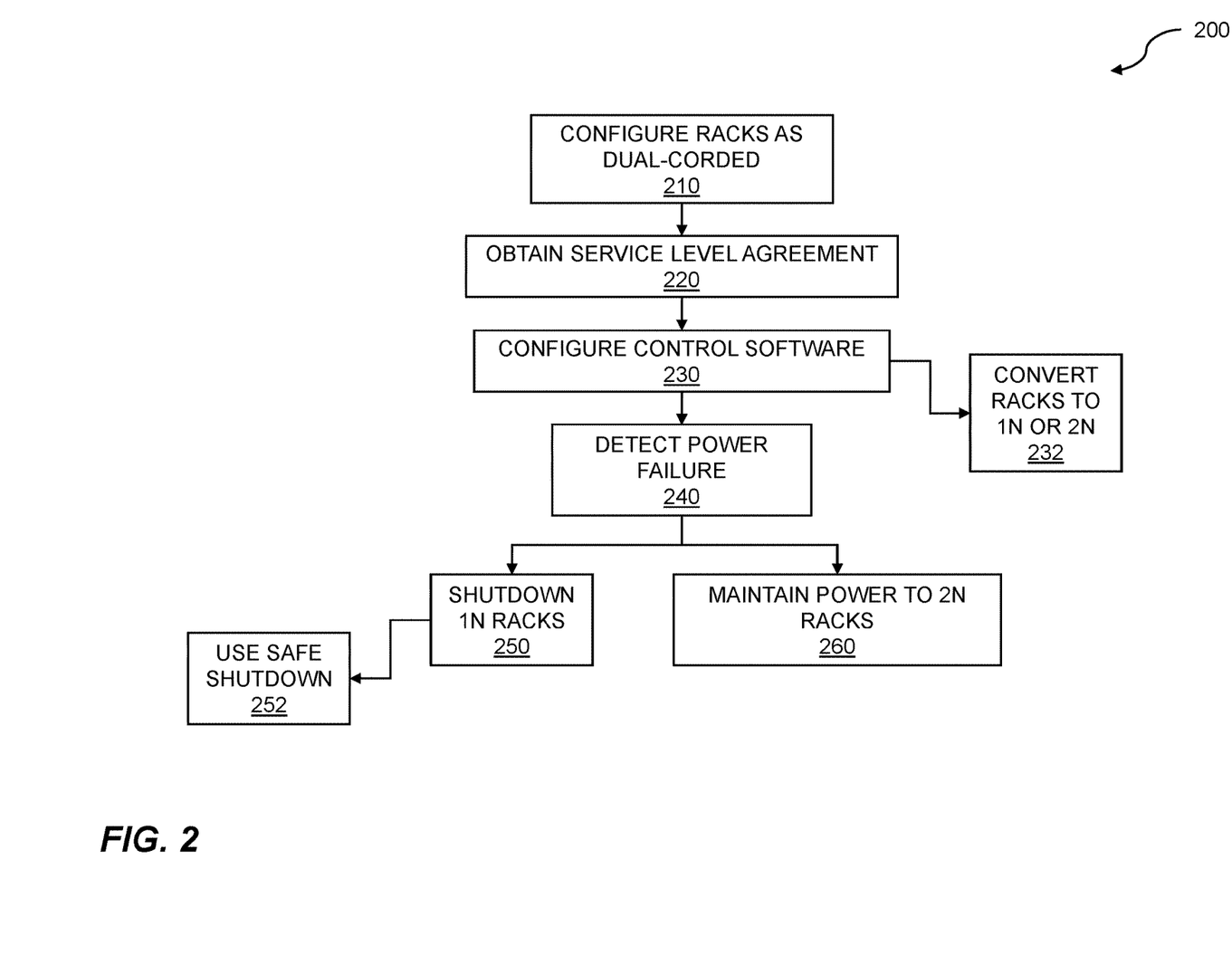
FIG. 2 is a flow diagram for achieving service level agreement (SLA) power distribution.

FIG. 2 is a flow diagram for achieving service level agreement (SLA) power distribution. The flow 200 includes configuring racks as dual-corded 210. The racks may include one or more electronic industries alliance (EIA) standard server racks. In some embodiments, the server racks include a 19-inch wide rack enclosure with rails which are 17¾" (450.85 mm) apart and configured with a unit height in 1.75" (44.45 mm) unit increments. As an example, a 42 U rack has an internal rack unit height dimension of 73.5 inches (1.8669 m). Within the rack, one or more servers, routers, switches, storage arrays, and/or other associated equipment is configured as dual-corded. In embodiments, the first set of servers comprises a datacenter rack.

The flow 200 includes obtaining a service level agreement (SLA) 220. The SLA may include one or more conditions that must be met to maintain the SLA. Conditions may include a schedule for configuration in a given power redundancy mode. The schedule can be daily, weekly, monthly, or some other time period. SLA conditions may include a percentage of uptime. SLA conditions may include environmental conditions for configuring 2N redundancy. These can include weather conditions such as extreme temperatures, severe weather, flooding, and so on.

The flow 200 continues with configuring control software 230. The control software may be distributed over multiple processors. One or more processors executing control software may reside within the power control switch. The flow continues with converting racks to 1N or 2N redundancy 232. The converting of racks can be based on criteria/conditions established in a service level agreement. The converting of racks can be based on environmental conditions. The converting of racks can be based on actual and/or predicted power consumption. The converting of racks can be based on an increase or decrease in the number of data racks online within a datacenter. The converting of racks can be based on current and/or forecast weather conditions. Other factors are possible as criteria for the converting of racks from one redundancy mode to another redundancy mode.

The flow 200 includes detecting a power failure 240. The detecting of a power failure can include use of a power detection circuit. In embodiments, the power detection circuit may include a zero-crossing detection circuit that triggers a pulse upon sensing each zero-crossing of an alternating current (AC) power signal. The pulse can be configured to restart a timer within a microcontroller. In embodiments, this includes coupling the pulse to an interrupt pin of the microcontroller. Upon assertion of the interrupt pin, and interrupt service routine (ISR) is invoked to reset the timer. Thus, for each zero-crossing, the timer is restarted. The timer timeout value can be configured to greater than or equal to the cycle time of the supplied AC (alternating current) power. For example, for 60 Hz power, a timeout value of 20 milliseconds can be established. If the timer reaches the timeout value, it can be indicative of a power outage. If power is functioning normally, a subsequent zero-crossing resets the timer before it can timeout. In other embodiments, an optical isolation technique may be used to detect the power disruption. In such an embodiment, one or more photodiodes may be configured to illuminate during normal AC operation. A corresponding photodetector circuit powered by a secondary source (e.g. battery backup) monitors the output of the photodiodes (LEDs). If the AC power is disrupted, the photodiodes are no longer illuminated. This state is detected by the photodetector (light sensor) which results in activation of a shutdown signal provided to racks that are configured as 1N redundancy only. The flow 200 thus continues with performing a shutdown of 1N racks 250. Thus, embodiments include detecting a power failure, and initiating a shutdown of the third set of servers in response to the detecting a power failure.

The flow 200 may include using a safe shutdown 252. The safe shutdown may include indicating the servers in 1N data racks to save data and/or program state and go into a shutdown or hibernation mode. In embodiments, an uninterruptible power supply (UPS) initiates a safe shutdown by sending a signal to the corresponding server via a serial port, Ethernet connection, or other suitable communication mechanism. The shutdown may be delayed until the battery level within the UPS falls below a predetermined threshold.

Upon receiving a shutdown signal from a UPS, the server may generate an internal signal such as SIGTERM to initiate the shutdown process. In embodiments, the shutdown process can include a warning notification to all logged-in users of the server that is getting shut down. The warning notification may indicate that the server is being shut down after a predetermined time interval (e.g. five minutes). The users may then have an opportunity to save any files prior to the shutdown.

The flow 200 continues with maintaining power to 2N racks 260. In embodiments, the datacenter includes equipment in any one of three power redundancy configurations. One or more pieces of equipment may be configured as permanent 2N redundancy. In embodiments, the second set of power loads is capable of receiving 2N redundancy. This equipment may be dual-corded equipment that is not coupled to a power control switch. Thus, embodiments include coupling the first power source and the second power source within the datacenter to a second set of power loads without going through the power control switch.

One or more pieces of equipment may be configured as permanent 1N redundancy. This equipment may be single-corded equipment that is not coupled to a power control switch. One or more pieces of equipment may be configured as dynamic 2N redundancy. The dynamic 2N redundancy equipment may include dual-corded equipment that is coupled to a power control switch. Based on conditions stipulated in service level agreements, environmental conditions, and power demand and/or availability, the dynamic 2N redundancy equipment may be configured in either 1N redundancy mode or 2N redundancy mode. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
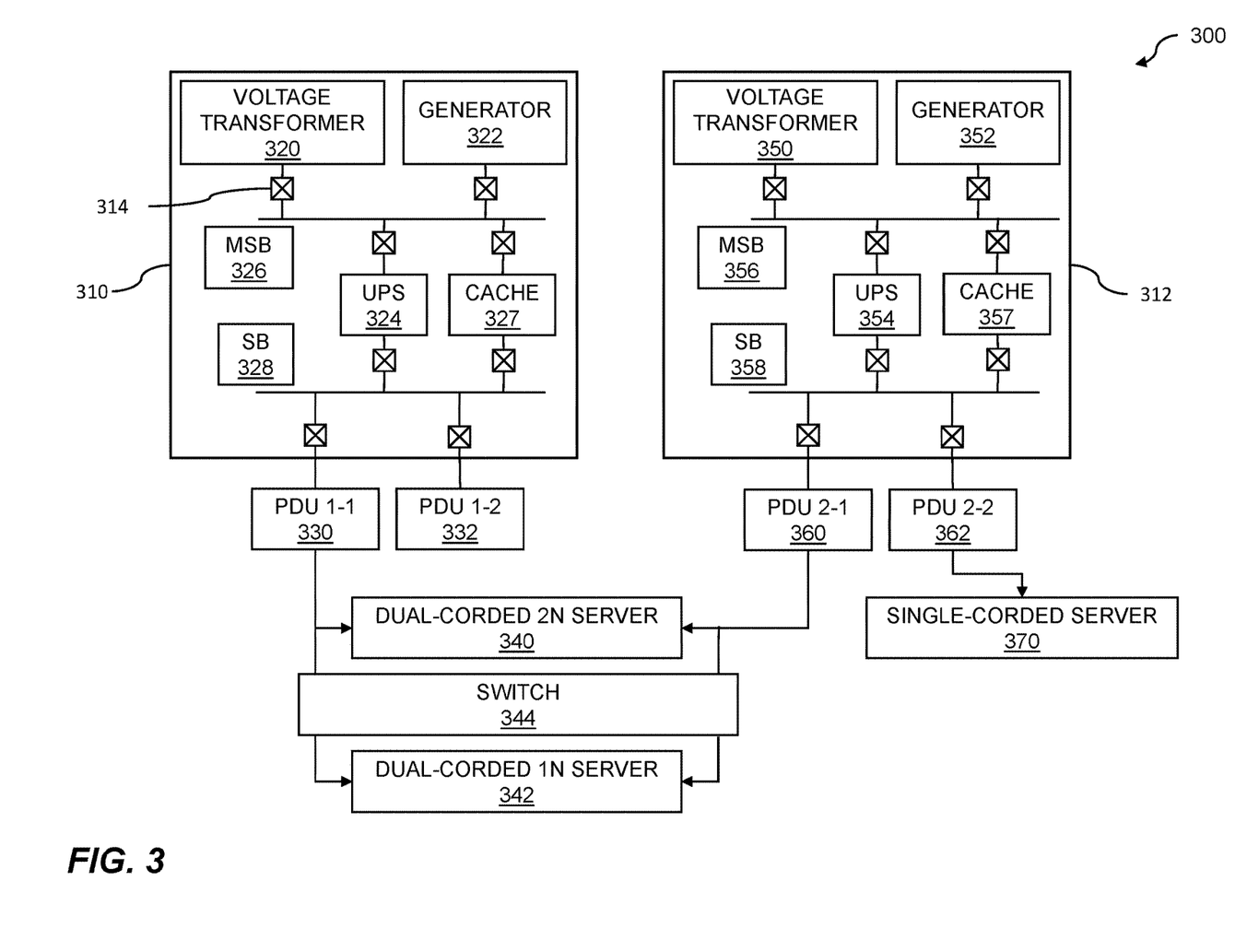
FIG. 3 shows an example datacenter power topology.

FIG. 3 shows an example datacenter power topology. The example 300 includes a first power source 310 and a second power source 312. In embodiments, the first power source 310 and second power source 312 may be grid sources. As an example, power source 310 may be a grid source powered by a first substation and power source 312 may be a grid source powered by a second substation. In this way, if one substation has a failure, the other substation may be used to continue operation of the connected power loads.

First power source 310 includes a generator 322. Generator 322 may be fueled by coal, natural gas, diesel, nuclear, wind, solar, hydroelectric, geothermal, or other suitable technology. A voltage transformer 320 converts the output of the generator to a desired voltage level for further power conditioning. Similarly, a second power source 312 includes a voltage transformer 350 and generator 352. Various elements within the first power source 310 are coupled to a breaker, indicated generally as 314. The breaker can be used to decouple the element in the event of a failure, routine maintenance, or other scenario requiring decoupling.

The first power source 310 and second power source 312 can include grid power, locally generated power such as solar and wind, backup power such as diesel generator sets, and so on. The power sources 310 and 312 include master switch blocks (MSB) (326 and 356). The power sources can also include one or more switch blocks (SB) (indicated as 328 and 358). The MSB is used to switch from externally sourced power such as grid, locally generated power, etc., to the uninterruptible power supply (UPS) (324 and 354). The switch to UPS can occur due to a power outage. The first power source 310 is connected to power distribution units (PDU) 330 and 332. The second power source 320 is connected to power distribution units (PDU) 360 and 362.

Electrical equipment such as dual corded equipment, single corded equipment, etc. can be connected to one or more PDUs. Dual corded servers can be connected to multiple sources. Thus, dual corded 2N server 340 can be connected to PDUs 330 and 360, and dual corded 1N server 342 can be connected to PDUs 330 and 360. Single corded server 370 can be connected to a single PDU 362. Power control switch 344 can be coupled to the dual-corded 1N server 342. Using dynamic redundancy, server 342 can be dynamically disconnected from PDU 330 or PDU 360 by switch 344. The switch 344 can be used to turn on and off equipment, to direct dynamic power from one equipment rack to another, to monitor SLA battery charge levels and discharge rates, etc. In embodiments, the switch 344 is controlled via software or firmware. The switch 344 can interpret power needs and execute policies for the datacenter. The switch 344 can execute the power policies through software programming. The dynamic redundancy can be controlled based on monitoring of power supplies and states of charge for various power caches. In addition dynamic redundancy can be implemented based on anticipated power situations and can be based on a time delay, e.g. 30 seconds hence, 2 minutes hence, etc. A power switch function can be implemented via a PDU where the output of the PDU is controlled to implement desired dynamic redundancy. A server 342 can implement dynamic redundancy through a baseboard management control (BMC) arrangement.

Thus, as shown in example 300, dual-corded 2N server 340 is configured as a permanent 2N redundancy server. It is always in 2N redundancy mode, as it is not coupled to the output of switch 344. Single-corded server 370 is configured in permanent 1N redundancy. Dual-corded 1N server 342 is configured as dynamic 2N redundancy. Depending on the output mode of switch 344, server 342 can be dynamically set to 1N redundancy mode or 2N redundancy mode.

The first power source 310 and/or second power source 312 may further include a power cache. As shown in example 300, power source 310 includes power cache 327 and power source 312 includes power cache 357. In some embodiments, power policies are used to establish behavior based on limits for power consumption, power generation, and other criteria. Rules are established to provide fractional power sharing and control under certain conditions. Power caches are used to supplement power sources under conditions of peak power requirements. When power requirements are below a threshold set forth in a power policy, the power caches are replenished. The power policies enable a convenient and effective way to manage the dynamic requirements of a modern datacenter. These policies enable increased power utilization and greater efficiency given a specific set of power sources and supplies. By use of policies, underused and unexploited power capabilities can be unlocked to enhance power utilization within a datacenter. In some cases, power policies can be employed to reduce the overall cost of utility power provided to datacenters. Power policies can also be used to establish rules and/or conditions to enable dynamic redundancy requirements.

Figure 4:
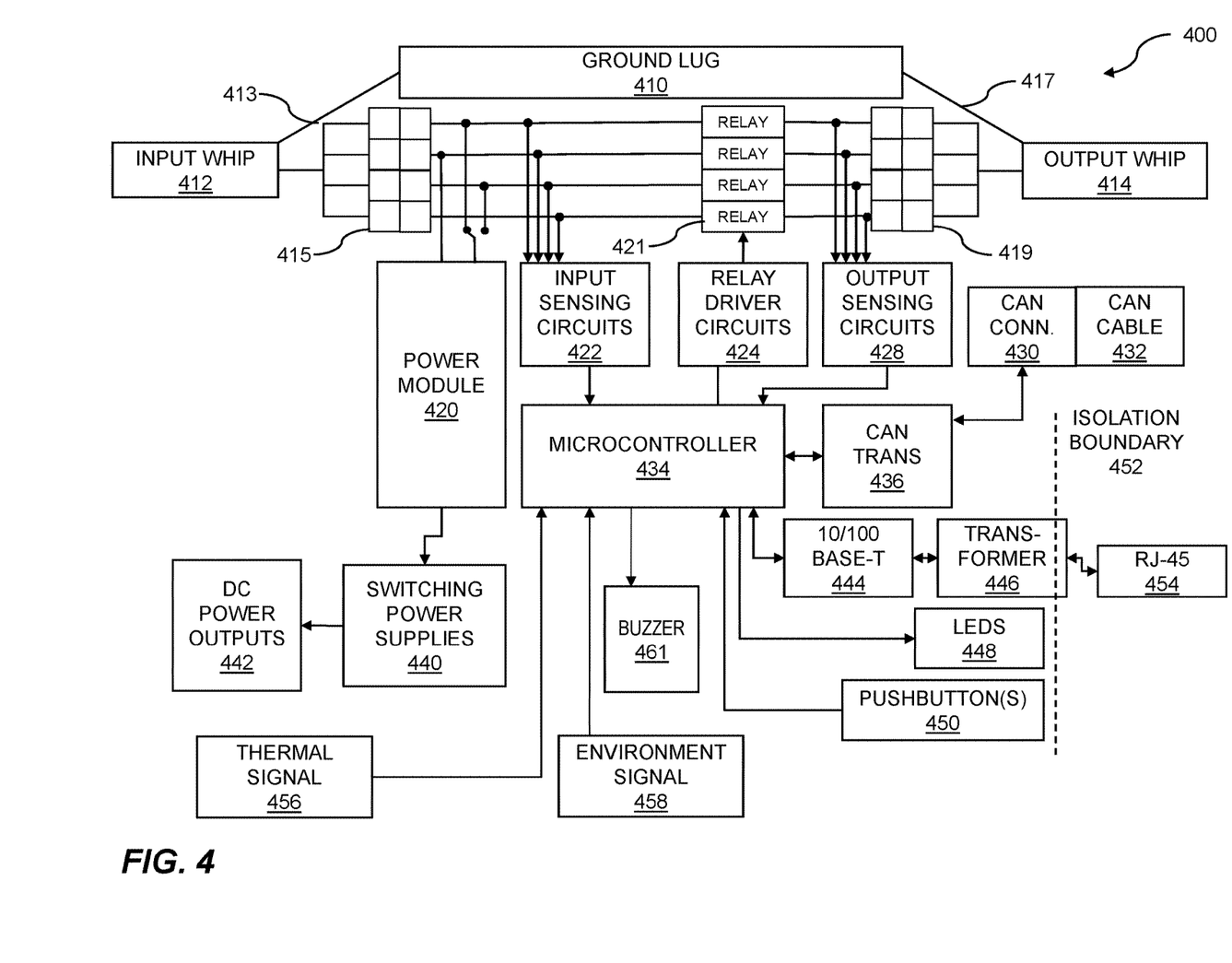
FIG. 4 illustrates an example block diagram of a control switch.

FIG. 4 is an example illustrating a block diagram of a control switch 400. The power requirements of large electrical equipment installations such as datacenters include high levels of reliability and resiliency. A flexible power availability model can be achieved using a layered architecture. Such a layered architecture can support mission-critical components and non-critical components when both types are present in a given platform. Mission-critical components, such as those managing power allocation to devices, can have minimal dependencies on other systems and can have direct access to instructions stored in processor memory in order to achieve fast response times. Less critical systems can rely on data in a persistent store and can take longer to respond in the event of a failure of a system.

Power control can be based on various algorithms, procedures, functions, heuristics, code segments, etc. The power control can be hierarchical, ranging from low level control to high level control. Low level power control can include specifically localized tasks such as turning on and off processors of a multiprocessor server, to power control across modules across blade servers, to power control in racks, and so on. As mentioned above, power control can include turning off 1N devices so that 2N devices can receive sufficient power during a power outage. High level control can range from power distribution across a datacenter to larger geographical considerations such as local and regional decisions affecting power control across multiple datacenter sites. The critical aspects of the power control, whether low, mid or high level are driven by various factors such as power consumption and heat dissipation, job scheduling, organizational requirements such as running payroll, etc.

Dynamic power resource allocation (DPRA) is an algorithm that can coordinate the action of peak power shaving devices and other power control devices to work together more efficiently and effectively in comparison to devices working independently using static limits. The goal of the algorithm is to make the collection of power control devices use no more than a specified amount of power while not having any power control device deplete their batteries. A central decision-making device or power control server polls the power control devices at a configurable frequency (e.g. every 10 seconds) for their state-of-charge, power in and power out. The power control server can determine which limits to set on each power control device, with the goal of having the limits add up to the global limit. A further goal can be to attempt to make the batteries of the power control devices charge or discharge so that they will end up with the same state of charge. After the limits are set on each individual power control, the power control device charges or discharges based on its load. When the DPRA is next executed, the power limit is recalculated based on the newly obtained power data resulting from execution of the DPRA.

Switch 400 is coupled to an input whip 412. A "whip" is a power cable that is typically run underneath the raised datacenter floor to help distribute electricity from a Power Distribution Unit (PDU) or Uninterruptable Power System (UPS) to servers and IT equipment. A ground signal 413 from the input whip 412 is coupled to a ground lug 410. Power connections from input whip 412 are coupled to input terminal block 415. The input whip 412 thus comprises multiple wires within it used for power delivery. These wires within the input whip 412 can be from different power sources, thus being capable of providing 1N or 2N redundancy.

A microcontroller 434 receives a variety of inputs and controls outputs based on the received inputs. A Controller Area Network (CAN) transceiver 436 is coupled to the microcontroller. A CAN connection 430 is coupled to the CAN transceiver 436. A CAN cable 432 is coupled to the CAN connection. The CAN is used to communicate with external equipment that may include other switches, monitoring equipment, and the like.

CAN provides an inexpensive, durable network that helps multiple CAN devices communicate with one another. An advantage to this is that electronic control units (ECUs) can have a single CAN interface rather than analog and digital inputs to every device in the system.

Each of the devices on the network has a CAN controller chip and is therefore intelligent. Messages are broadcast on the CAN such that all devices on the network see all transmitted messages. Each device can decide if a message is relevant or if it should be filtered. This structure allows modifications to CAN networks with minimal impact.

Every CAN message has a priority, so if two nodes try to send messages simultaneously, the one with the higher priority gets transmitted and the one with the lower priority gets postponed. This arbitration is non-destructive and results in non-interrupted transmission of the highest priority message. This also allows networks to meet deterministic timing constraints.

The CAN specification includes a Cyclic Redundancy Code (CRC) to perform error checking on each frame's contents. Frames with errors are disregarded by all nodes, and an error frame can be transmitted to signal the error to the network. Global and local errors are differentiated by the controller, and if too many errors are detected, individual nodes can stop transmitting errors or disconnect from the network completely.

The microcontroller is further coupled to a wired Ethernet connection. The wired Ethernet connection includes an RJ-45 interface 454 configured across an isolation boundary 452 to a transformer 446. The transformer 446 is coupled to a 10/100 BASE-T interface 444 which is in turn coupled to the microcontroller 434. In addition to providing isolation, transformer 446 can help eliminate common-mode noise and mitigate issues such as power surges. While this embodiment discloses a transformer 446 for isolation, other embodiments may employ another isolation technique instead of, or in addition to, the transformer 446. The additional/alternate isolation technique may include, but is not limited to, capacitive isolation, inductive isolation, and/or resistive isolation.

In embodiments, an SLA enforcement computing device may communicate to the switch 400 via the RJ-45 interface 454. One or more messages may be sent to/from the switch 400 and the SLA enforcement computing device. The messages may contain instructions for the switch 400 based on conditions established in a service level agreement. In this way, the redundancy mode of one or more pieces of equipment within a datacenter may be dynamically changed between 1N and 2N as required to maintain a service level agreement.

An input sensing circuit interface 422 is coupled to microcontroller 434. The input sensing circuit interface 422 detects presence of power on the input whip 412. In embodiments, upon detecting a power disruption, a signal is asserted on the input sensing circuit interface 422. The asserted signal may cause an interrupt service routine (ISR) to execute on the microcontroller 434 to perform one or more actions in response to a change in the status of power on the input whip.

Switch 400 is coupled to an output whip 414. A ground signal 417 from the ground lug 410 is coupled to the output whip 414. Power connections from output terminal block 419 are coupled to the output whip 414.

A relay driver circuit interface 424 is coupled to microcontroller 434. The relay driver circuit interface 424 is configured to control the position of the relays (indicated generally as 421). The relays may be configured in an open position or in a closed position. When a given relay is in a closed position, power from the input whip 412 is connected to the output whip 414. When the relay is in an open position, power from the input whip 412 is disconnected from the output whip 414.

In embodiments, upon detecting a power disruption, a signal is asserted on the input sensing circuit interface 422. The asserted signal may cause an interrupt service routine (ISR) to execute on the microcontroller 434 to perform one or more actions in response to a change in the status of power on the input whip. The actions can include changing the redundancy mode of one or more servers, initiating a shutdown of one or more servers, or other suitable action.

An output sensing circuit interface 428 is coupled to microcontroller 434. The output sensing circuit interface 428 detects presence of power on the output whip 414. In embodiments, upon detecting a power disruption, a signal is asserted on the output sensing circuit interface 428. The asserted signal may cause an interrupt service routine (ISR) to execute on the microcontroller 434 to perform one or more actions in response to a change in the status of power on the output whip. In embodiments, the ISR for output sensing can include a relay configuration confirmation operation (RCCO). In embodiments, when the microcontroller 434 commands a particular relay to be in an open position, within a predetermined time interval (e.g. 300-500 milliseconds), the output sensing circuit will normally generate an interrupt based on a change in the output circuit. In the event that no interrupt occurs after the predetermined time interval, an alert condition is generated indicating the possibility of a relay failing or a relay stuck in a closed position. This alert may then be sent to a monitoring system via the RJ-45 interface 454.

Similarly, when the microcontroller 434 commands a particular relay to be in a closed position within a predetermined time interval (e.g. 300-500 milliseconds), the output sensing circuit will normally generate an interrupt based on a change in the output circuit. In the event that no interrupt occurs after the predetermined time interval, an alert condition is generated indicating the possibility of a relay failing and stuck in an open position. In embodiments, the alerting mechanism to support an RCCO may include setting a software timer prior to configuring a change in a relay position. If the relay is functioning properly, an interrupt service routine generated by the output sensing circuit interface 428 executes, cancelling the timer before it expires. If the relay malfunctions, the interrupt service routine does not occur, causing the timer to expire. The expiry of the timer is configured to generate the alert. This alert may also then be sent to a monitoring system via the RJ-45 interface 454. This alerts datacenter personnel to the potential of a failed relay within the switch 400, such that the switch can be serviced and/or replaced. Additionally, the switch 400 may further include a buzzer 461 coupled to the microcontroller 434. In embodiments, the microcontroller 434 activates the buzzer 461 to provide an audible alert in addition to the message sent via the RJ-45 interface 454. In this way, personnel located in proximity to the switch can receive an audible indication of which switch has experienced a possible failure.

The microcontroller 434 may further include one or more light emitting diodes (LEDs) 448 and/or one or more pushbuttons 450. The LEDs may serve to provide a current status of a switch. In an embodiment, an input power LED illuminates green when input power is detected. Similarly, an output power LED illuminates green when output power is detected and red when output power is not detected. A relay error LED is unilluminated when a relay is functioning properly, and the relay error LED is illuminated red when a given relay is deemed to be malfunctioning based on the output sensing circuits. Other combinations of LEDs, and/or color schemes are possible. A pushbutton 450 may be used to configure the switch into a variety of modes including OFF, ON, and TEST. In OFF mode, all relays 421 are configured to the open position. In TEST mode, all relays 421 are configured to the closed position. In ON mode, the switch 400 enters normal operation, and the relays are set based on various inputs such as SLA conditions and/or environmental and power supply/demand levels. In some embodiments, the configuration of the switch and the mode (ON, OFF, TEST) may be configured remotely via the RJ-45 interface. In some embodiments, the microcontroller may implement an HTTP webpage server such that a remote computer can log into the switch to set the desired mode using a standard web browser. Note that while three modes (ON, OFF, TEST) are described here, other switch modes are possible.

The switch 400 further includes a power module 420. In embodiments, the power module 420 receives AC power ranging from 90 volts to 277 volts, and outputs a direct current (DC) power. In embodiments, the DC power output includes +12V DC power. The +12V DC power from the power module 420 is provided to switching power supplies 440. The switching power supplies 440 are configured to generate a variety of DC outputs 442, including, but not limited to, −12V DC, +5V DC, +3.3 VDC, and/or +1.2V DC. Other DC voltages are possible. The DC voltages may be used to power local equipment such as circuit boards, batteries, and other peripherals within or connected to the switch 400.

The switch 400 may further include thermal signal device 456 that is coupled to microcontroller 434. In embodiments, the thermal signal device 456 comprises a thermistor. The thermistor is an electrical resistor whose resistance is greatly reduced by heating, used for measurement and control. The thermistor may be used in implementation of an overtemperature detection circuit (ODC). When the ODC asserts an overtemperature condition, the switch 400 may take an action that may include changing a redundancy mode and/or issuing an alert to an external system via the RJ-45 interface 454.

The switch 400 may further include an environment signal 458 that is configured as an input to microcontroller 434. The environment signal 458 may be configured to receive a signal from a contact closure device such as an Emergency Alert System (EAS) receiver, weather radio, moisture sensor, fire alarm, or another suitable device. For example, an EAS receiver can be programmed to generate a contact closure signal upon determination of a weather condition within the area (e.g. tornado watch). In such conditions, the weather alert generates a signal detected by the microcontroller that can be used to generate an action, such as switching equipment to/from 2N redundancy mode.

The input whip 412 comprises multiple individual wires/cables that deliver power. Some of the wires may receive power from a first power source while other wires within the input whip may receive power from a second power source. The switch 400 can thus control power from multiple sources. Dual-corded equipment can be coupled to multiple wires from the output whip. The dual-corded equipment comprises two power cords. A first power cord of a server can be connected to a first wire of the output whip that receives power from a first power source. A second power cord of the server can be connected to a second wire of the output whip that receives power from a second power source. Each wire of the input whip is connected to a corresponding wire of the output whip with a relay disposed between the input whip and output whip. Thus, the switch can open or close a relay to connect or disconnect a wire within the output whip. In this way, the switch 400 can configure a connected server as 1N redundancy or 2N redundancy, depending on dynamic conditions. In an emergency condition (e.g. fire alarm signal), the switch can shut off both sources of power to a server to immediately deenergize it (e.g. to prevent further damage). Thus, the switch 400 of disclosed embodiments enables a new level of configuration for providing redundant power. This feature is useful in a variety of applications, and is particular well-suited for datacenters.

Figure 5:
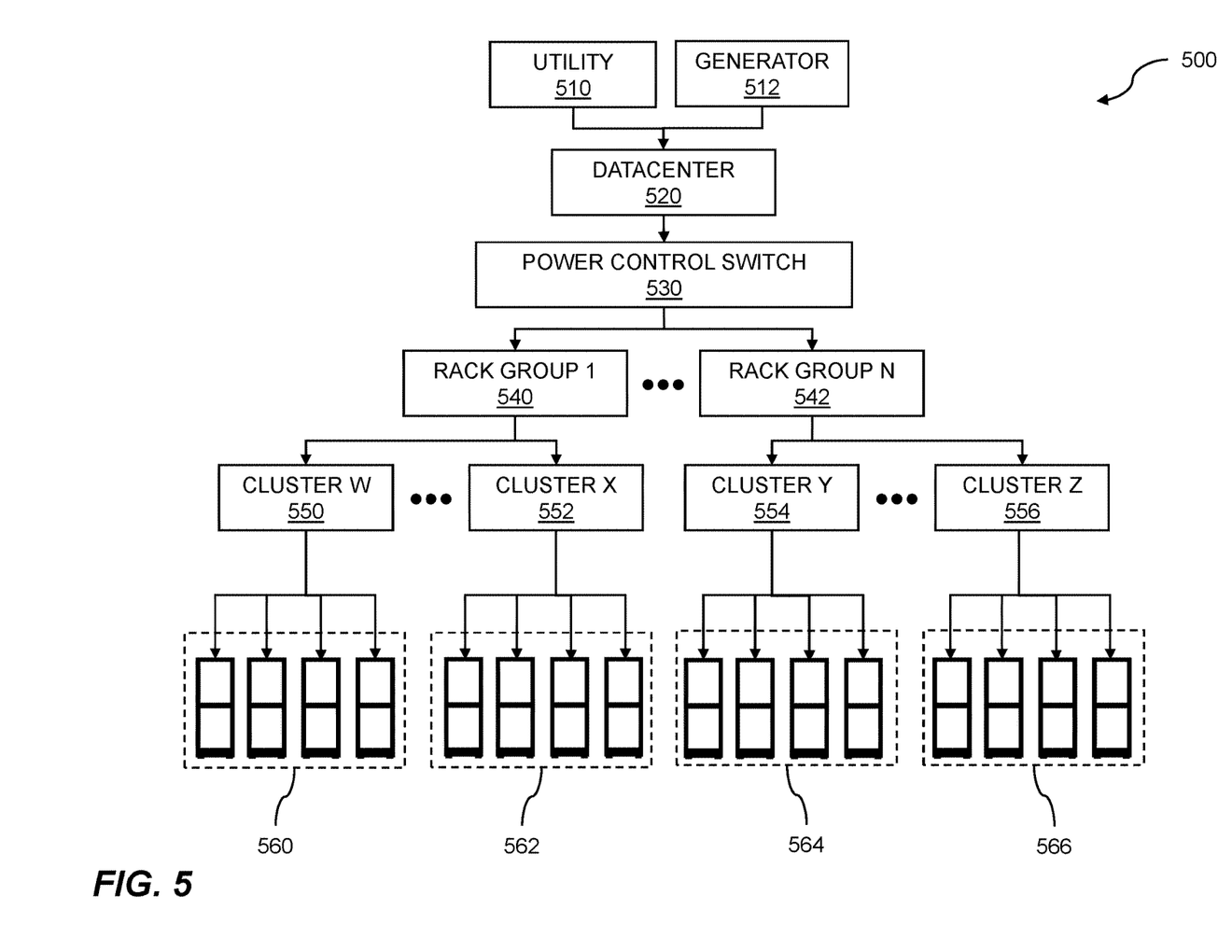
FIG. 5 illustrates hierarchical allocation of power control.

FIG. 5 illustrates hierarchical allocation of power control. The example 500 includes power sources including a utility 510 and a generator 512 as the top level of the hierarchy. The utility can include a local or regional energy provider. The example 500 further includes a datacenter 520 that receives power from the utility 510 and/or generator 512. In embodiments, the combination of the utility 510 and generator 512 are combined to enable dynamic 2N redundancy. Thus, in embodiments the second set of power loads is provided 2N redundancy by the first power source and the second power source within the datacenter.

Within the datacenter 520, a power control switch 530 enables dynamic redundancy control of one or more pieces of equipment within the datacenter. The next downstream level of the hierarchy is the group level. The group level includes multiple groups, indicated as rack group 1 540 and rack group N 542. Each group can have a group policy. The group policy can include a hierarchical set of policies. The policies can be used to implement service level agreement rules. Thus, in embodiments, a power policy is used to implement rules for the service level agreement.

The policies can include criteria for switching a piece of equipment, such as a dual-corded server, between 1N redundancy and 2N redundancy. In embodiments, the criteria within the power policies are implemented as multiple IFTTT (If This Then That) statements.

For a given server X, one or more conditional statements may be used to define behavior as part of a power policy and/or service level agreement. In embodiments, the power policies are based on service level agreements. Examples of such statements may include:
  If (power requirements exceed threshold T1) then (dynamically configure server X as 1N)
  If (power requirements fall below threshold T2) then (dynamically configure server X as 2N)
  If (date/time within range D) then (dynamically configure server X as 2N)
  If (date/time outside of range D) then (dynamically configure server X as 1N)
  If (weather condition is SEVERE) then (dynamically configure server X as 2N)
  Where:
  T1 is a first power level
  T2 is a second power level
  D is a date/time range
  X is an identifier for a particular server within a datacenter
  SEVERE is a weather condition as indicated by a weather source such as a National Weather Service. Such a signal can originate from a device supporting the National Weather Radio Service Specific Area Message Encoding (SAME) protocol. This protocol enables generation of warnings for a specific geographical area.

In embodiments, a variety of message event codes may be aggregated into a SEVERE status. Thus, reception of any of the message codes deemed severe can generate a SEVERE status. In embodiments, the following codes generate a SEVERE status: Flash Flood Watch: FFA, Winter Storm Warning: WSW, High Wind Warning: HWW, Tsunami Watch: TSA, Tsunami Warning: TSW, River Flood Watch: FLA, River Flood Warning: FLW. Upon receiving one or more of these codes, the switch 400 can, as an example, dynamically invoke 2N redundancy on some datacenter equipment, initiate a shutdown of other 1N redundancy datacenter equipment.

In other embodiments, the environmental signal can also include an earthquake signal from an Earthquake Early Warning (EEW) system such as ShakeAlert, which is sponsored by the United States Geological Survey (USGS). These systems typically operate by detecting P-waves from an earthquake, which travel faster than the more destructive S-waves. Such systems can provide anywhere from a few seconds to a few minutes of warning of an impending earthquake. In response to detecting an earthquake signal, the switch 400 can initiate a dynamic redundancy change which can include setting some equipment within the datacenter to 2N redundancy, setting some equipment within the datacenter to 1N redundancy, and/or initiating a shutdown of some equipment within the datacenter.

Within the groups, the next downstream level of the hierarchy is the cluster level. The group 540 includes multiple clusters, indicated as clusters 550 and 552. The group 542 includes multiple clusters, indicated as clusters 554 and 556. Thus, in embodiments, the datacenter comprises a plurality of clusters of data racks. Each cluster includes multiple data racks. The cluster 550 includes the data racks 560. The cluster 552 includes the data racks 562. The cluster 554 includes the data racks 564. The cluster 556 includes the data racks 566. Thus, the datacenter can include a plurality of clusters of data racks. In embodiments, the power cache comprises multiple batteries spread across the multiple data racks. Embodiments include dynamically allocating power from the power source across the plurality of data racks.

During operation of the system, power policies are propagated downstream from the datacenter 520 to the group level, and from the group level to the cluster level, and from the cluster level to the data rack level. The datacenter comprises multiple data racks. Operating conditions and/or power requirements are sent upstream. Thus, each data rack reports operating information to a cluster controller within its corresponding cluster. Each cluster reports operating information to a group controller within its corresponding group. Each group reports operating information to a datacenter controller. In this way, information, status, and operating conditions can quickly propagate through the system to allow power policies to act on that information in a timely manner. The policies can include criteria for executing dynamic changes in redundancy for one or more servers within the racks. This can include changing servers from 1N redundancy to 2N redundancy and/or changing servers from 2N redundancy to 1N redundancy.

Figure 6:
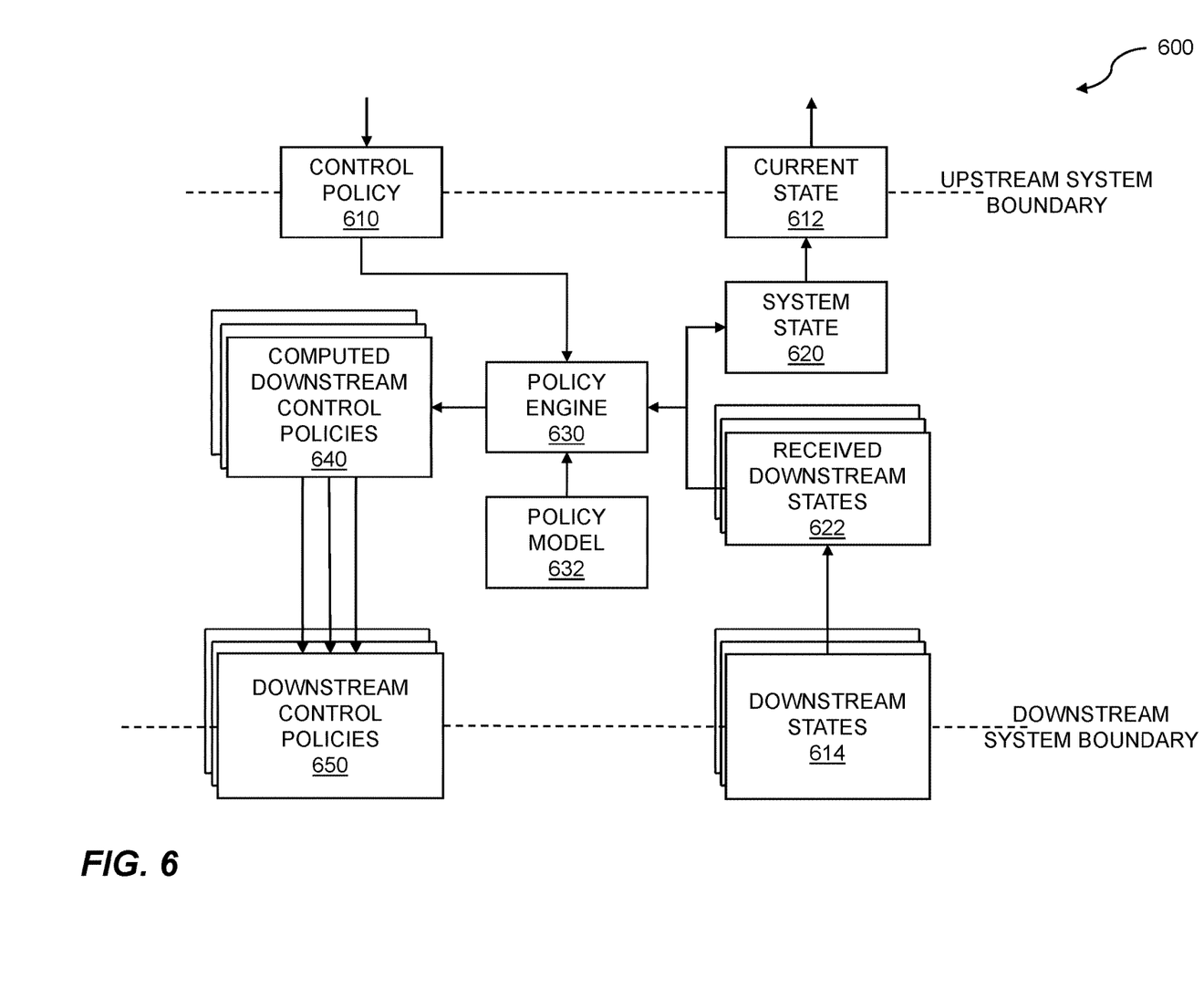
FIG. 6 shows control system arrangement.

FIG. 6 shows control system arrangement. The example 600 includes a policy engine 630 that receives a policy model 632 and a control policy 610. This control policy can come from upstream and be a power requirement from a higher level in the hierarchy. The control policy 610 can include an overall constraint or limit. For example, the control policy 610 can include establishing a maximum instantaneous consumption power limit of 1200 kW. In another such example, the control policy 610 can include establishing that dynamically redundant servers are configured with 1N redundancy when available power falls below a predetermined threshold. This makes more power available to higher priority servers to reduce the risk of an outage. Thus, in embodiments, the dynamically changing is based on power policies for the datacenter.

The policy model 632 contains implementation rules for how to achieve the constraints of the control policy 610. For example, the policy model 632 can define rules for activating and/or deactivating power sources and/or power caches. The example 600 can include enabling the power cache to provide power to the power load when power requirements of the power load exceed limits of the power source, wherein the limits are defined by a set of power policies for the datacenter. The policy engine can then output computed downstream control policies 640 based on the policy model 632. These are passed down to the next lower hierarchy level as downstream control policies 650.

Downstream states 614 are passed upwards to be received by the downstream states 622 of the policy engine 630. The downstream states can include power consumption rates, estimated power demand, operating temperatures of equipment, overheating conditions, and the like. The policy engine 630 outputs a system state 620 which is passed upstream as the current state 612. In embodiments, states include, but are not limited to, online, offline, fault, cache enabled, cache disabled, cache charging, and/or cache discharging.

Figure 7:
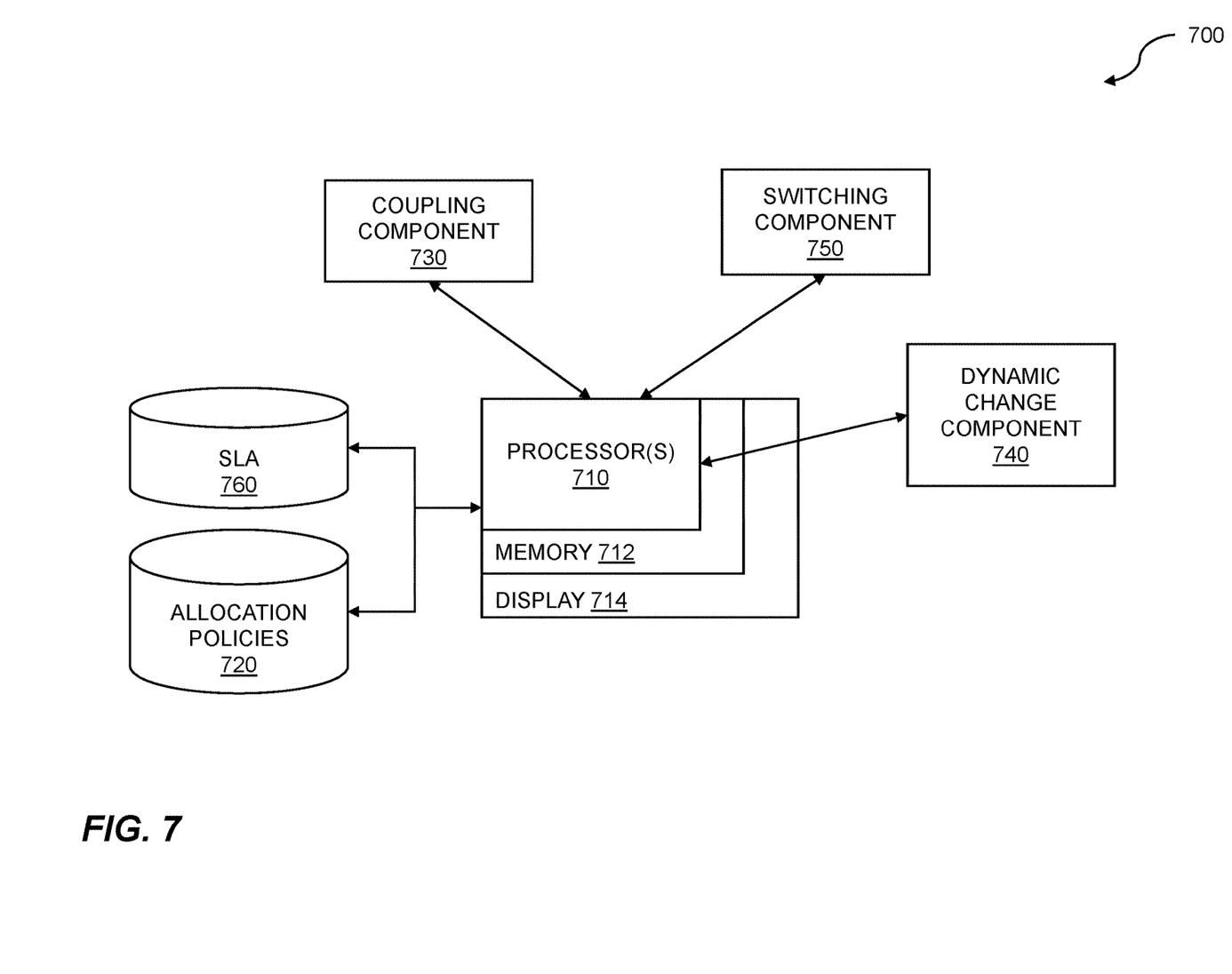
FIG. 7 is a system diagram for datacenter power management using dynamic redundancy.

FIG. 7 is a system diagram for datacenter power management using dynamic redundancy. The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, for storing databases of power sources, power caches, and power loads, for storing information pertaining to load requirements, for storing information pertaining to redundancy requirements, for storing power policies, for service level agreement (SLA) criteria, for system support, and the like. Information about the various dynamic redundancy configurations can be shown on a display 714 connected to the one or more processors 710. The display can comprise a television monitor, a projector, a computer monitor (including a laptop screen, a tablet screen, a net book screen, and the like), a cell phone display, a mobile device, or another electronic display.

The system 700 includes allocation policies 720. In embodiments, the allocation policies 720 are stored in a networked database, such as a structured query language (SQL) database. The allocation policies 720 can include limits, such as power consumption limits, as well as switch configurations when certain conditions are met. For example, when conditions allow peak shaving to take place, and surplus power exists, the power policies can identify switches and their configurations to allow replenishing of the power caches. The system 700 further includes a coupling component 730 that allows power sources to be coupled to power loads in a datacenter.

The system 700 further includes a dynamic change component 740. The dynamic change component can include computers, peripherals, sensors, and/or other hardware and software for monitoring current and forecast power consumption, and monitoring environmental factors such as weather, temperature, and the like.

The system 700 further includes a switching component 750. The switching component is configured and disposed to dynamically change the power redundancy mode of one or more servers or other pieces of equipment. The switching component may switch one or more servers or other pieces of equipment from 1N redundancy to 2N redundancy and vice versa. Similarly, the switching component may switch one or more servers or other pieces of equipment from 2N redundancy to 1N redundancy. The dynamic change component 740 may include reconfiguring the switching component 750 to implement power policies and/or service level agreements.

The system 700 further includes an SLA component 760. In embodiments, the SLA component 760 may include an SLA enforcement computing device. The SLA component 760 may further include a database, library, and/or tables containing representations of one or more SLAs. The SLAs can contain rules and/or conditions for when 2N redundancy is required and/or when 1N redundancy is acceptable for a given server, rack, cluster, group, datacenter, or other level of granularity.

The system 700 includes a computer system for power control comprising: a memory which stores instructions; one or more processors attached to the memory wherein the one or more processors, when executing the instructions which are stored, are configured to: couple a first power source and a second power source within a datacenter to a first set of power loads through a power control switch, wherein: the first set of power loads is capable of receiving 2N redundancy; the first power source and the second power source combined provide 2N redundancy to the first set of power loads; the power control switch includes software programming; and the power control switch changes the redundancy to the first set of power loads from 2N redundancy to 1N redundancy based on the software programming.

Disclosed embodiments can include a computer program product embodied in a non-transitory computer readable medium for power control, the computer program product comprising code which causes one or more processors to perform operations of: coupling a first power source and a second power source within a datacenter to a first set of power loads through a power control switch, wherein: the first set of power loads is capable of receiving 2N redundancy; the first power source and the second power source combined provide 2N redundancy to the first set of power loads; the power control switch includes software programming; and the power control switch changes the redundancy to the first set of power loads from 2N redundancy to 1N redundancy based on the software programming.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for power control comprising:
    coupling a first power source and a second power source within a datacenter to a first set of power loads through a power control switch, wherein:
        the first set of power loads is capable of receiving 2N redundancy;
        the first power source and the second power source combined provide 2N redundancy to the first set of power loads;
        the power control switch includes software programming; and
        the power control switch changes the redundancy to the first set of power loads from 2N redundancy to 1N redundancy based on the software programming; and
    coupling the first power source and the second power source within the datacenter to a second set of power loads without going through the power control switch.

2. The method of claim 1 further comprising dynamically changing from 2N redundancy to 1N redundancy using the power control switch.

3. The method of claim 2 wherein the dynamically changing is based on power requirements for a second set of power loads.

4. The method of claim 3 wherein the power requirements for a second set of power loads include 2N redundancy.

5. The method of claim 2 further comprising dynamically restoring 2N redundancy using the power control switch.

6. The method of claim 2 wherein the dynamically changing is based on power policies for the datacenter.

7. The method of claim 6 further comprising executing the power policies through software programming.

8. The method of claim 1 further comprising dynamically changing from 1N redundancy to 2N redundancy using the power control switch.

9. The method of claim 8 further comprising dynamically restoring 1N redundancy using the power control switch.

10. The method of claim 1 wherein the first set of power loads comprises a first set of servers.

11. The method of claim 10 wherein the first set of servers is dual-corded.

12. The method of claim 10 wherein the first set of servers comprises a datacenter rack.

13. The method of claim 1 wherein the second set of power loads is capable of receiving 2N redundancy.

14. The method of claim 13 wherein the second set of power loads is provided 2N redundancy by the first power source and the second power source within the datacenter.

15. The method of claim 13 wherein the second set of power loads comprises a second set of servers.

16. The method of claim 15 wherein the second set of servers is dual-corded.

17. The method of claim 1 further comprising coupling the first power source within the datacenter to a third set of power loads without going through the power control switch.

18. The method of claim 17 wherein the third set of power loads is capable of receiving 1N power redundancy.

19. The method of claim 18 wherein the third set of power loads is provided 1N redundancy by the first power source within the datacenter.

20. The method of claim 18 wherein the third set of power loads comprises a third set of servers.

21. The method of claim 20 wherein the third set of servers is single-corded.

22. The method of claim 21 further comprising detecting a power failure, and initiating a shutdown of the third set of servers in response to detecting the power failure.

23. The method of claim 1 wherein a service level agreement (SLA) power provisioning is provided to the first set of power loads by the first power source, the second power source, and the power control switch.

24. The method of claim 23 wherein a power policy is used to implement rules for the service level agreement.

25. A computer program product embodied in a non-transitory computer readable medium for power control, the computer program product comprising code which causes one or more processors to perform operations of:
    coupling a first power source and a second power source within a datacenter to a first set of power loads through a power control switch, wherein:
        the first set of power loads is capable of receiving 2N redundancy;
        the first power source and the second power source combined provide 2N redundancy to the first set of power loads;
        the power control switch includes software programming; and
        the power control switch changes the redundancy to the first set of power loads from 2N redundancy to 1N redundancy based on the software programming; and
    coupling the first power source and the second power source within the datacenter to a second set of power loads without going through the power control switch.

26. A computer system for power control comprising:
    a memory which stores instructions;
    one or more processors attached to the memory wherein the one or more processors, when executing the instructions which are stored, are configured to:

couple a first power source and a second power source within a datacenter to a first set of power loads through a power control switch, wherein:
   the first set of power loads is capable of receiving 2N redundancy;
   the first power source and the second power source combined provide 2N redundancy to the first set of power loads;
   the power control switch includes software programming; and
   the power control switch changes the redundancy to the first set of power loads from 2N redundancy to 1N redundancy based on the software programming; and
couple the first power source and the second power source within the datacenter to a second set of power loads without going through the power control switch.

* * * * *